United States Patent [19]

Young

[11] 3,874,987

[45] Apr. 1, 1975

[54] LAMINATE OF A MOISTURE IMPERVIOUS POLYETHYLENE FOAM AND A SUSPENSION CHLORINATED POLYETHYLENE SHEET

[75] Inventor: Warren L. Young, Baton Rouge, La.

[73] Assignee: The Dow Chemical Company, Midland, Mich.

[22] Filed: Mar. 13, 1974

[21] Appl. No.: 450,628

[52] U.S. Cl.............. 161/160, 156/306, 161/165, 161/254, 220/26 E
[51] Int. Cl............................................. B32b 3/26
[58] Field of Search ........... 161/160, 161, 165, 254; 220/26 E; 156/306, 309

[56] References Cited
UNITED STATES PATENTS

| | | | |
|---|---|---|---|
| 2,983,962 | 5/1961 | Merz et al.................... | 161/160 UX |
| 3,411,967 | 11/1968 | Rowland et al..................... | 161/160 |
| 3,515,612 | 6/1970 | Rauhut.............................. | 161/160 |
| 3,530,213 | 9/1970 | Belle Isle........................... | 161/160 |
| 3,562,059 | 2/1971 | Gladen.............................. | 161/160 |

Primary Examiner—William J. Van Balen
Attorney, Agent, or Firm—Ronald G. Brookens

[57] ABSTRACT

A laminate structure consisting essentially of (A) a substantially moisture impervious polyethylene foam underlayer in combination with (B) a covering layer of a suspension chlorinated substantially linear polyethylene said covering layer being characterized by inherent flexibility, solvent weldability and excellent resistance to weathering; said laminate structure being particularly useful as a floating cover for liquid storage reservoirs.

3 Claims, No Drawings

3,874,987

LAMINATE OF A MOISTURE IMPERVIOUS POLYETHYLENE FOAM AND A SUSPENSION CHLORINATED POLYETHYLENE SHEET

BACKGROUND

It is known in the art to float a cover over reservoirs to prevent contamination of potable water, and over chemical disposal and treatment or waste disposal and treatment facilities. In a typical construction a flotation member, e.g., foamed polystyrene in the form of logs or mats, is sandwiched between two layers of rubber sheeting. The disadvantage of such construction lies in the fact that considerable labor is required for properly seaming the sheeting around the flotation member. Further, the rigidity of the flotation member requires careful allowances to accommodate changes in liquid level within the reservoir due to the possible development of stress between the cover sheeting and the flotation member which lead to abrasive damage of the sheeting.

It is an object of the present invention to provide an economical construction utilizing a flexible flotation material of outstanding chemical inertness and a firmly bonded covering layer having excellent strength and resistance to weathering, which covering layer is also inherently flexible and capable of being solvent welded to itself.

In this regard, the chemical inertness of polyethylene is well known to the art and the use of a polyethylene foam for flotation offers economical advantages over other foam materials. It is further known, however, that polyethylene has relatively poor resistance to weathering including, particularly, the degrading effects of ultraviolet radiation, even when protected by conventionally used screening additives. Still further, it is recognized in the art that polyethylene does not bond well to most other plastic or rubber materials which could serve as a protective covering. It has now been discovered, which discovery represents the present invention, that certain chlorinated polyethylene sheeting can be effectively heat laminated to polyethylene foam structures to provide a laminate structure which is particularly adapted for use as a floating cover for liquid storage reservoirs.

SUMMARY OF THE INVENTION

The above and related objects are accomplished by preparation and utilization of a laminate structure consisting essentially of (A) a substantially moisture impervious polyethylene foam underlayer in combination with (B) a covering layer which is characterized by inherent flexibility, solvent weldability and excellent resistance to weathering, said covering layer being prepared from a sheet of chlorinated ethylene polymer prepared by the suspension chlorination of an ethylene polymer having an essentially linear structure. The ethylene polymer is selected from the group consisting of polyethylene and interpolymers composed of at least about 90 mole percent ethylene with any remainder being at least one ethylenically unsaturated comonomer. The ethylene polymer is first chlorinated at a temperature below its agglomeration temperature up to a chlorine content of from about 2 to 23 percent chlorine based on the weight of said ethylene polymer, followed by the sequential suspension chlorination of such polymer in a particulate form at a temperature above its agglomeration temperature but at least about 2°C below its crystalline melting point to provide a chlorination product characterized by regions in which a minor portion of the chlorine atoms along the polymer chain are distributed in a non-statistical block type fashion while the remainder of the polymer is chlorinated in a random manner characteristic of chlorination products obtained by solution chlorination techniques. The chlorinated ethylene polymer contains from about 35 to about 50 weight percent of chemically combined chlorine, preferably at least about 40 percent chlorine, and has a relative crystallinity of less than about 10 percent. The chlorinated polyethylene is used in sheet form having a thickness of at least about 0.01 of an inch, a tensile strength of at least about 1000 pounds per square inch, an elongation of between about 200 and 1000 percent and at 100 percent modulus of between about 150 and 300 pounds per square inch.

The polyethylene foam used in the present invention may be any cellular polyethylene which is substantially impervious to moisture. A particularly preferred method for the preparation of such material is set forth in U.S. Pat. No. 3,067,147, issued Dec. 4, 1962. The thickness and density of such foamed underlay is not critical to the present invention except insofar as providing the capability of the laminate structure to float on the liquid being covered.

The chlorinated polyethylene employed for preparing the sheet material used in the present invention is readily obtained by the practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers, to a desired total of combined chlorine content, wherein such polymer is first chlorinated at a temperature above its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2°C. below its crystalline melting point for a period sufficient to provide a combined chlorine content of up to about 50 weight percent, based on the total weight of the polymer.

The temperature at which the chlorination normally leads to an agglomeration of the polymer depends to a large extent on the nature and the molecular weight of the polyolefin to be chlorinated. In the case of crystalline and predominantly straight chain polyethylenes having a branching of the chains of less than 1 methyl group per 100 carbon atoms and a density of at least 0.94, i.e., polyethylenes which are predominantly obtained by the low pressure synthesis, the aforesaid temperature is above 95°C, in particular above 100°C or even above 110°C. In the case of polyethylenes having a relatively marked branching of the chains and a lower density and which are normally prepared by polymerizing ethylene under a high pressure, the said temperature limit is lower, namely, at about 65°C.

Further, it has been found that if the first stage chlorination is carried out to an amount exceeding about 23 weight percent chlorine, based on the total weight of the polymer, excessive amounts of polymeric materials having the chlorine substituents present in considerable block-like concentration or grouping along the polymer molecules are produced with resultant losses in elasticity and resistance to the deleterious effects of heat.

Additionally, it has been found that the sequential chlorination must be conducted at a temperature above that temperature employed for the first chlorination, but below the crystalline melting point of the polyethylene starting material, to provide materials having the combination of desirable properties described herein. In this regard, it has been found that the temperature employed in such sequential chlorination must necessarily be greater than that employed in the initial chlorination to prevent the retention of excessive undesirable crystallinity with resultant formation of non-uniformly chlorinated polymer; furthermore, if such temperature is above the crystalline melting point of the polymer being chlorinated, particularly when using polymer having a molecular weight of between about 20,000 and 300,000, it has been found that particle size growth is greatly accelerated with resultant development of undesirable agglomeration of the polymer material.

Thus, the temperature employed in the herein described sequential suspension chlorination is that temperature at which a desirable balance between particle growth and destruction of crystallinity is obtained. Such temperature is, therefore, highly critical and is advantageously individually determined with respect to the polyethylene used, the desired chlorine content, and the desired physical properties of the so-formed chlorinated polymeric material.

Still further, it has been found that in this critical temperature range, particulary in the upper portions of it, control of particle size is very essential to the process. Unless particle growth is controlled by some means, agglomeration of the particles may proceed to the point where lumps of several inches or more in diameter are formed. These large lumps make it practically impossible to wash out entrained acid and the heat resistance of the product is lessened. The very low surface area of these lumps also makes it impossible to obtain good distribution of the chlorine atoms in the polymer.

Preferably, the polyolefinic materials to be chlorinated are those distinct species and varieties of essentially linear and unbranched highly porous polymers containing at least about 90 mole percent ethylene in the polymer molecule with a remainder being one or more ethylenically unsaturated comonomers, such polymers being prepared under the influence of catalyst systems comprising admixtures of strong reducing agents such as triethyl aluminum and compounds of groups IV-B, V-B and VI-B metals of the Periodic System, such as titanium tetra-chloride, and the like, and having a molecular weight less than about 1,000,000 and preferably between about 20,000 and 300,000, to provide for optimum flexibility i.e., a 100 percent modulus of less than about 500 psi and preferably less than about 300 psi.

Exemplary of useful ethylenicallly unsaturated comonomers are the non-aromatic hydrocarbon olefins having 3 or more carbon atoms such as propylene, butene-1 and 1,7-octadiene and the like; cycloaliphatic olefins such as cyclopentene and 1,5-cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

It is to be pointed out, however, that conventionally prepared low density, branched polyolefins may often be advantageously chlorinated by the process of the present invention, providing such materials are available in finely comminuted form.

The inert liquid which is employed to suspend the finely divided polymer in the suspension chlorinating procedure of the present invention may be any liquid which is inert to the polymer and is not affected to an appreciable extent by chlorine, or which, while wetting the polymer will not have an appreciable solvent effect on it. While water may be employed with especial advantage as an inert suspending liquid for polyolefins to be chlorinated, the polymer may also be suspended in other inert liquids.

A variety of wetting agents, including sulfonates, sulfates, polyphosphates and other types of ionic and non-ionic surfactant materials may be suitably employed, if desired, to assist the inert suspending liquid, particulrly when it is water, to wet the polymer. Such materials as sodium lauryl sulfate and alkyl aryl polyether alcohols are illustrative of specific wetting agents that may be utilized. The employment of a wetting agent facilitates the suspension and uniform distribution of the polymer during the chlorination. In some cases, however, it may not be necessary to employ wetting agents, especially when a freshly prepared polymer is employed that is undried after its preparation or when efficient agitation is available for producing and maintaining the polymer slurry.

If it is desired to accelerate the chlorination rate, the reaction may be assisted by the employment of small quantities of catalysts, such as the free-radical types and/or ultra-violet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azo-type compounds and peroxides selected from the group of free-radical catalysts consisting of tertiary butyl peroxide; tertiary butyl hydroperoxide; and the like may advantageously be employed. Preferably, when catalysts are employed, such catalysts should be one which has an efficient rate of decomposition in the suspending medium in which it is dissolved in the required temperature range. In this regard, it may be advantageous to employ a mixture of such catalysts, one of which has a temperature of efficient decomposition at or near the optimum initial chlorination temperature, and the other having an efficient decomposition at or near the optimum sequential chlorination temperature. Such catalysts may be added in a single step or continuously depending upon the reaction conditions and catalyst used.

Part of the suspension chlorination procedure of the present invention may be carried out at the atmospheric pressure; however, best results are generally obtained wherein super-atmospheric pressures are employed. Such clorination pressure is not critical except as neccessary to obtain an efficient rate of reaction. In this regard, it is pointed out that for a given catalyst or admixture thereof, at a given concentration in the suspending medium, the reaction rate is conveniently controlled by the rate of feed or chlorine and/or its partial pressure in the reaction vessel.

After a polyolefinic material has been suspension chlorinated to a desired degree, it may easily be filtered from suspension in the inert suspending liquid and washed and dried to prepare it for subsequent use.

The entire chlorination procedure or any desired part of it may be carried out batchwise or by continuous processing arrangements. For batch operations, it is ordinarily suitable to employ conventional autoclaves and kettles or the like for conducting the reaction. However, it may also be conveniently conducted in a continuous process by one of several suitable techniques. For example, it may be conducted by countercurrent movement of the reactants through either horizontally or vertically disposed reactors which may be in the form of tubes and towers, or by using a cascading principle with a series of interconnected reaction chambers.

Substantially quantitative yields, based on the weight of the polymer to be chlorinated, may be frequently obtained by the chlorinating technique of the present invention. The attainment of such yields, as has been indicated, may often be facilitated by the practice of recycling techniques for unreacted portions of the chlorine and by conducting the involved reactions at more moderate rates.

Stabilizers may also be included in the compositions to protect the chlorinated olefin polymer against possible decomposition by the heat of processing or by subsequent exposure of fabricated sheet material to climatic and environmental conditions of use. Suitable stabilizers include those materials conventionally employed in the preparation of vinyl polymer and copolymer sheet compositions, e.g., organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the chlorinated olefin polymer constituent. Other conventional additives, such as nonepoxidized fatty acids and oils, and low molecular weight polymers and waxes may also be employed, if desired.

Although the chlorinated olefin polymers employed for the purposes of the present invention are inherently resistant to burning, it may in some instances be advantageous to incorporate minor amounts, i.e., from about 1 and 10 parts per 100 parts of chlorinated olefin polymer of one or more flame-retarding agents, e.g., oxides of antimony and/or various halogenated materials such as tetrabromophthalic anhydride, perchloropentacyclodecane, tris(2,3-dibromopropyl)phosphate, tetrabromo bisphenol-A, among many others.

It is generally unnecessary to add conventionally employed plasticizers to the compositions from which the sheet materials used in the present invention are formed. However, plasticizers conventionally employed for vinyl polymers may be used in concentrations less than about 15 percent by weight of polymer as processing aids if desired.

The sheet materials used in the present invention may be prepared by conventional techniques wherein the chlorinated olefin polymer is prepared as described herein and blended with other polymers such as polyvinyl chloride, preferably in amounts up to about 25 percent by weight, and polyethylene, preferably in amounts up to about 20 percent by weight, and the like as well as the desired fillers and stabilizers, etc., substantially in the manner as conventionally employed in preparing vinyl chloride polymer and copolymer sheeting compositions. Thus, for example, the necessary ingredients may be initially dry blended in a mixer such as a ribbon blender and subsequently milled as on a two-roll compounding mill at roll temperatures between about 240°F and 400°F until the mixture becomes homogeneous. The blend may then be extruded into sheet form or calendered to give the desired sheet thickness.

In forming the laminate structure of the present invention the foamed polyethylene, of any desired thickness or configuration, is laminated by heat to the chlorinated polyethylene sheet. Such lamination may be accomplished either during the production of the chlorinated polyethylene sheet, e.g., as in calendering or extrusion, or in a post-laminating step wherein the polyethylene foam, or polyethylene which is to be subsequently foamed, and preformed chlorinated polyethylene sheeting are contacted under the influence of heat. In either instance, the chlorinated polyethylene must be heated to and maintained at a temperature at least about 40°F above the melting temperature of the polyethylene foam underlayment, during the lamination process. The utilization of such elevated temperature is critical for obtainment of an adequate bond which is created by the melt collapsing of a layer of foamed polyethylene with subsequent welding of such collapsed area to the chlorinated polyethylene sheet.

Generally, pressures applied during the laminating process are in the range of from about 0.2 to about 10 psi with pressures of from about 0.6 to about 5 psi being preferred. In any event, the pressure must not cause excessive collapse of the foam underlayer.

The laminate structures contemplated herein include any configuration having an underlayment of a polyethylene foam and a covering layer of the prescribed chlorinated polyethylene sheeting. Preferred configurations are substantially flat laminate structures wherein the chlorinated polyethylene sheet is bonded to a foamed polyethylene sheeting of slightly lesser width. In this manner, the laminate can be readily joined to adjacent panels by solvent welding or adhesive bonding of superimposed layers of the chlorinated polyethylene sheeting.

It is to be noted that the present invention contemplates utilization of the laminate materials for other applications, e.g., as a vapor barrier insulation material or as a roofing membrane and the like.

The following examples, wherein all parts and percentages are to be taken by weight, illustrate the present invention but are not to be construed as limiting its scope.

Example 1

In each of a series of experiments, an aqueous slurry comprising from about 3200 to 3600 grams of water and 160 to 180 grams of a polyethylene having an essentially linear and unbranched molecular structure containing less than about 1 methyl group per 100 methylene units in its molecule; a density of about 0.96; an average molecular weight of about 67,000 and which had been prepared using a catalyst composed of triisobutyl aluminum and titanium tetrachloride; was charged to a 1½ gallon autoclave with from 6.4 to 7.2 grams of calcium chloride; from 3.2 to 3.6 grams of magnesium silicate; about 0.5 cc of ditertiary butyl peroxide; and from about 24 to 27 drops of a commercially available wetting agent. Each charge was then separately chlorinated, as a first suspension chlorination step, under about 13 to 47 psi (gauge) of chlorine pressure at a temperature of between about 82° and 115°C until a chlorine content of between about 5 and 23 percent was obtained.

Following completion of such first chlorination step, each charge was further individually chlorinated in a second suspension chlorination step, under a gauge pressure of 17–35 psi (as was considered necessary to obtain an efficient rate of chlorination), at a temperature of 126°C until a total chlorine content of between 35 and 45 percent was obtained.

For comparative purposes, samples of the nonchlorinated polyethylene were individually placed in aqueous suspension essentially as described herein, and subsequently chlorinated in a single step to a total chlorination content of about 34 percent, utilizing a temperature of from about 115° to 120°C. These samples are hereinafter identified as comparison (A).

In yet another comparison, a sample of the same non-chlorinated polyethylene was separately suspension chlorinated in two steps essentially as described herein, but wherein an excess of chlorine was introduced during the first chlorination step. This sample is hereinafter identified as comparison (B).

In still another comparative experiment a sample of the non-chlorinated polyethylene polymer was placed in a reactor and dissolved in symmetrical 1,1,2,2,-tetrachloroethane. The reactor was flushed with nitrogen and chlorine gas passed therein while maintaining the temperature from 115° to 120°C during the chlorination, and the reaction mixture agitated. At the end of the reaction period, the reaction mixture was poured into from 5 to 7 times its volume of methanol, which acted as an antisolvent to precipitate the polymer. The solvent was then removed and the residue dried. This sample is hereinafter identified as comparison (C).

The following Table I summarizes the physical properties of the above-described chlorinated polymers.

The column headings of the following Tables I, II, and III have the following meanings:

| | |
|---|---|
| % Chlorine for Suspension Chlorinated Materials | Determined by titration of HCl in aqueous slurry |
| % Chlorine for Solution Chlorinated Materials | Determined by titration of chloride ions using AgNO₃ |
| % Relative Crystallinity | Ratio of crystalline peak areas to the sum of the amorphous plus crystalline peak area as determined by conventional X-ray diffraction |
| % Elongation | As per ASTM Test No. D-142-61T |
| Tensile Strength, psi | As per ASTM Test No. D-142-61T |
| Heat Stability | Time in minutes for a stabilized polymer* to become dark red in color while being milled on a two roll compounding mill operating at 370°F. |
| 100% Modulus | As per ASTM Test No.D-412-62T |

*Materials containing conventional amounts and types of vinyl resin stabilizers such as metallic mercaptides, epoxide containing compounds and/or metallic soaps and the like.

The data of Table I clearly illustrate that the chlorinated polyethylene sheet prescribed for use by the present invention is characterized by having unexpectedly enhanced flexibility (reduced 100 percent modulus), as compared to the prior known suspension chlorinated materials designated as comparisons A and B. Further, it is apparent that such sheet has greater elongation at a given chlorine content than such prior known suspension chlorinated materials. It is also apparent that such sheet materials have an inherent flexibility and elongation characteristic of prior known solution chlorinated materials with an accompanying increase in tensile strength.

By way of further illustration of the desirable properties of the chlorinated polyethylene sheet materials prescribed for use by the present invention, a 5 percent aqueous slurry of a copolymer composed of (1) about 99.3 weight percent ethylene and (2) about 0.7 weight percent butene having an essentially linear and unbranched molecular structure, except for such butene branches; a density of greater than about 0.94; a melt index of about 0.34; a relative crystallinity of about 48.1 percent; and which has been prepared by the previously referred-to Ziegler process using triethyl aluminum and titanium tetrachloride; was chlorinated in two stages in suspension essentially as described herein and the chlorinated product recovered and tested as described therein.

TABLE I

| | Chlorination Procedure | | | | | | | |
|---|---|---|---|---|---|---|---|---|
| | Step 1 | | Step 2 | | Relative Crystal-linity | Elonga-tion, % | Tensile Strength (psi) | 100% Modulus (psi) |
| Run No. | Temp.°C | %Chlorine | Temp.°C | Final % Chlorine | | | | |
| Comparison (A) (Suspension) | | | | | | | | |
| 1 | 115 | 34 | – | 34 | 26.5 | 230 | 2170 | 2170 |
| 2 | 120 | 34 | – | 34 | 28.6 | 350 | 1830 | 1840 |
| Comparison (B) (Suspension) | | | | | | | | |
| 3 | 90 | 26.3 | 126 | 34 | 12 | 573 | 1710 | 575 |
| Comparison (C) (Solution) | | | | | | | | |
| 4 | 115-120 | 37.0 | – | 37.0 | 0 | 800 | 1220 | 170 |
| This Invention | | | | | | | | |
| 5 | 94-97 | 18 | 126 | 43.2 | 0 | 500 | 1775 | 220 |
| 6 | 89.5-95 | 23 | 126 | 45 | 0 | 500 | 1900 | 270 |
| 7 | 101-114.5 | 22 | 126 | 35 | – | 600 | 1750 | 265 |
| 8 | 101-102 | 5 | 126 | 45 | 0 | 400 | 1525 | 190 |

TABLE II

| | Chlorinated Linear Ethylene/Butene Copolymer | | | | | | | | |
|---|---|---|---|---|---|---|---|---|---|
| | Chlorination Procedure | | | | % | | | | |
| | Step 1 | | Step 2 | | Relative | Heat | | Tensile | 100% |
| Run No. | Temp. °C. | % Chlorine | Temp. °C. | Final % Chlorine | Crystal- linity | Stability, Minutes | Elonga- tion % | Strength (psi) | Modulus (psi) |
| For Comparison | | | | | | | | | |
| 9 | 86 | 32.6 | — | 32.6 | 25 | 20 | 100 | 1850 | 1850 |
| This Invention | | | | | | | | | |
| 10 | 87 | 18.2 | 118 | 34 | 1 | 32 | 800 | 1300 | 200 |
| 11* | 86.5 | 17.7 | 118.5 | 34.5 | 1 | — | 800 | 1500 | 200 |

*40 grams of TiO₂ added to reaction vessel prior to chlorination.

Table II summarizes the physical properties of the previously-described chlorinated copolymer as well as those properties of the same ethylene/butene copolymer which was chlorinated in a single step for purposes of comparison.

Example 2

To 4000 grams of deionized water was added, with stirring, 200 grams of a polyethylene having an essentially linear and unbranched structure (containing less than about 1 methyl group per 100 methylene units), and having a melt index of about 1 and a molecular weight of about 67,000. Such polyethylene had been previously prepared by a process using a catalyst composed of triisobutyl aluminum and titanium tetrachloride. The resulting admixture was then charged to a 1½ gallon autoclave with 8 grams of calcium chloride; about 0.5 cc of a 70 percent solution of ditertiary butyl peroxide in butanol; and about 10 drops of a commercially available wetting agent.

The charge was then chlorinated, in a first chlorination step, under about 30 psi (gauge) of chlorine pressure at a temperature of about 90°C until a chlorine content of about 20 percent was obtained. The charge was then chlorinated in a second suspension chlorination step, at a temperature of about 126°C until a total chlorine content of about 42 percent was obtained. The chlorination product was then isolated from the dispersion by filtration, washed free of residual hydrochloric acid and dried.

The dried material was then used to prepare the following formulation by dry-blending of the designated materials in a Banbury mixer.

| Material | Parts by Weight |
|---|---|
| Chlorinated Polyethylene | 100 |
| Liquid barium-cadmium stabilizer | 2 |
| Phosphite stabilizer | 0.5 |
| Epoxidized Oil | 3.0 |
| Antimony oxide | 3.0 |
| Chlorinated polyethylene wax | 2.0 |
| Talc | 10 |
| Carbon black | 2.5 |
| Stearic acid | 0.5 |
| Polyethylene wax | 1 |

The dry blend was then extruded in sheet form at a temperature of about 375°–400°F into calender rolls to form an essentially unoriented sheet having a thickness of about 0.015 of an inch.

The following Table III illustrates various physical properties inherent in the so-formed linear material.

TABLE III

Typical Physical Properties

Ultimate Tensile Strength:
ASTM D 882-61T     1700–2000 psi

Ultimate Elongation:
ASTM D 882-61T     600–800%

Typical Physical Properties

100% Modulus (Tensile stress at 100% elongation):
ASTM D 882-61T     — 200 psi

2% Secant Modulus:
ASTM D 882-61T     — 750 psi

Low Temp Brittleness:
ASTM D 746     — 55°F.

Tear Resistance, 20 mil film:
D 1004-59T     1.9 No. Mach. Dir.
    2.1 No. Cross Dir.

Water Vapor Transmission Rate:
E 96-53T, Method E     .26 permeability for 10 mil
    .15 permeability for 20 mil Water Extraction:
D 1239-55     0% extraction
(24 hrs. at 73°F.)     4% H₂O absorption Properties After Exposure Weathering:     % change in properties after

| | 2 yrs.45° South, Arizona | 2000 hours Fadeometer |
|---|---|---|
| Ult. Tensile, psi | +19% | 0% |
| Ult. Elongation | − 6% | +1% |
| 100% Modulus | +14.5% | — |
| Weight Change | — | −.78% |

Chemical Exposure

| | % change after 1 month at 160°F. in | | |
|---|---|---|---|
| | Brine | Crude Oil | ASTM Oil No. 1 |
| Ult. Tensile | −6% | −52% | +14% |
| Ult. Elongation | +3.5% | +12% | −2% |
| 100% Modulus | +26% | −16% | +70% |

It is apparent from the data presented above that the cover sheet materials used in the present invention are inherently flexible without the addition of plasticizers and, in addition, retain their flexibility at low temperatures, are resistant to weathering and burning and have desirable tensile strength, and dimensional stability under widely varying environmental conditions. Such materials are also capable of being easily welded to each other by application of conventional solvents such as methylethyl ketone, toluene, xylene and the like.

By way of comparison, it has been shown that only these materials comprising the present invention have the necessary combination of inherent flexibility, elongation, tensile strength, and solvent weldability.

By way of further illustration it has been found that utilization of chlorinated olefin polymers having molecular weights of about 1 million or more are generally incapable of being fabricated into sheetlike structures without the addition of significant amounts of plasticizers or other processing aids. By way of specific illustration, it has been found that the non-plasticized chlorinated polyolefins as described in Example 1 above can be extruded through a standard Instron Rheometer orifice, using a 190°C barrel temperature, at a 150 Sec-1 shear rate with a resultant shear stress of from 25–35 psi, whereas, under the same conditions chlorinated polyethylenes having a molecular weight of from 1 million to 5 million are characterized by a shear stress of greater than about 85 psi and often cannot be made to pass through the orifice of the rheometer.

Still further, it has been found that utilization of chlorinated polyolefins as herein described, but having a chlorine content of greater than about 50 weight percent provides sheet material having undesirably high modulus and reduced resistance to heat and light. Also, chlorinated polyolefins, as herein described, but having a chlorine content of less than about 35 weight percent are characterized by reduced solvent weldability properties.

Example 3

In each of a series of experiments a chlorinated polyethylene sheet was prepared as described in Example 2 herein and laminated, while hot, with a layer of fine celled polyethylene foam wherein the chlorinated polyethylene sheeting was maintained at a temperature of at least 40°F above the melting point of such foam throughout the lamination process. A lamination pressure of from about 0.2 to about 10 psi was employed. In all instances, after lamination, the chlorinated polyethylene layer could not be separated from the form underlayer without tearing the laminate structure. The so-formed laminate structures were capable of being wound on a core to form a roll and subsequently used as a protective floating cover for liquid storage reservoirs without delamination taking place.

By way of comparison, utilization of the same lamination techniques but substituting the herein prescribed chlorinated polyethylene cover layer with a flexible vinyl, butyl rubber or neoprene cover layer formed, in all cases, composite structures wherein such cover sheet was easily peeled away from the polyethylene foam underlayer. These composite structures cannot be succcessfully wound on a core to form a roll and subsequently unrolled for use as floating covers, without undesirable delamination taking place.

What is claimed is:

1. A laminate structure consisting essentially of (A) a substantially moisture impervious polyethylene foam underlayer in combination with (B) a covering layer of a sheet of chlorinated ethylene polymer prepared by the suspension chlorination of an ethylene polymer having an essentially linear structure, said ethylene polymer being selected from the group consisting of polyethylene and interpolymers composed of at least about 90 mole percent ethylene with any remainder being at least one ethylenically unsaturated comonomer wherein said ethylene polymer is first chlorinated at a temperature below its agglomeration temperature up to a chlorine content of from about 2 to 23 percent chlorine based on the weight of said ethylene polymer, followed by the sequential suspension chlorination of such polymer in a particulate form at a temperature above its agglomeration temperature but at least about 2°C below its crystalline melting point and wherein the chlorination product is characterized by regions in which a minor portion of the chlorine atoms along the polymer chain are distributed in a non-statistical block type fashion while the remainder of the polymer is chlorinated in a random manner characteristic of chlorination products obtained by solution chlorination techniques; said chlorinated ethylene polymer containing from about 35 to about 50 weight percent of chemically combined chlorine and having a relative crystallinity of less than about 10 percent; said sheet having a thickness of at least about 0.01 of an inch, a tensile strength of at least about 1000 pounds per square inch, an elongation of between about 200 and 1000 percent and a 100 percent modulus of between about 150 and 300 pounds per square inch.

2. The laminate structure of claim 1 wherein said covering layer is laminated to said polyethylene foam underlayer while said covering layer is maintained at a temperature of at least about 40°F above the melting point of said polyethylene foam underlayer while using a lamination pressure of from about 0.2 to about 10 psi.

3. The laminate structure of claim 2 wherein said chlorinated polyethylene contains at least about 40 percent chlorine.

* * * * *